United States Patent [19]

Treybig

[11] Patent Number: 4,950,411
[45] Date of Patent: * Aug. 21, 1990

[54] CORROSION INHIBITOR COMPOSITIONS

[75] Inventor: Duane S. Treybig, Lake Jackson, Tex.

[73] Assignee: The Dow Chemical Company, Midland, Mich.

[*] Notice: The portion of the term of this patent subsequent to Apr. 26, 2005 has been disclaimed.

[21] Appl. No.: 311,690

[22] Filed: Feb. 16, 1989

Related U.S. Application Data

[63] Continuation-in-part of Ser. No. 136,571, Dec. 22, 1987, abandoned, which is a continuation-in-part of Ser. No. 847,966, Apr. 3, 1986, abandoned.

[51] Int. Cl.$^5$ ............................................. C23F 11/00
[52] U.S. Cl. ............................. 252/8.555; 252/8.553; 252/390; 252/392; 544/336
[58] Field of Search ................. 252/8.553, 8.555, 390, 252/392; 544/336; 422/7, 16

[56] References Cited

U.S. PATENT DOCUMENTS

| | | | |
|---|---|---|---|
| 2,792,403 | 5/1957 | Blicke | 260/296 |
| 3,025,313 | 3/1962 | Gunderson | 252/390 |
| 3,077,454 | 2/1963 | Monroe et al. | 252/392 X |
| 3,410,861 | 11/1968 | McCloskey | 260/296 |
| 3,553,220 | 1/1971 | Etherington, Jr. et al. | 260/290 |
| 4,415,708 | 5/1985 | Haslegrave et al. | 252/390 |
| 4,740,320 | 4/1988 | Treybig et al. | 252/8.555 |

OTHER PUBLICATIONS

Chem. Ber., E. Profft. vol. 91, pp. 957–960 (1958).
Chem. Ber., E. Profft. and H. W. Linke, vol. 93, pp. 2591–2603 (1960).
J. Heterocyclic Chem., A. M. Singerman and R. Levine, vol. 1, pp. 151–152 (1964).
J. Amer. Chem. Soc., G. Magnus and R. Levine, vol. 78, pp. 4127–4130 (1956).
J. Amer. Chem. Soc., A. P. Phillips, vol. 78, pp. 4441–4443 (1956).
J. Org. Chem., G. M. Singerman and R. Levine, vol. 30, pp. 4379–4380 (1965).
J.Org. Chem., L. E. Brady, M. Freifelder and G. R. Stone, vol. 26, pp. 4757–4758 (1961).
J. Amer. Chem. Soc., H. E. Reich and R. Levine, vol. 77, pp. 4913–4915 and pp. 5434–5436 (1955).

Primary Examiner—Richard D. Lovering
Assistant Examiner—Chhaya Sayala

[57] ABSTRACT

Corrosion inhibitor compositions for metals are disclosed which comprise (a) the product resulting from reacting a vinyl substituted pyrazine such as 2-vinylpyrazine with a primary or secondary amine such as dodecanamine in the presence of a catalyst such as acetic acid and (b) a suitable carrier liquid such as isopropanol. These corrosion inhibitors are particularly useful in the protection of downhole oil and gas well production and drilling equipment.

5 Claims, No Drawings

CORROSION INHIBITOR COMPOSITIONS

CROSS REFERENCE TO RELATED APPLICATION

This application is a continuation-in-part of application Ser. No. 136.571 filed Dec. 22, 1987 (now abandoned) which is a continuation-in-part of application Ser. No. 847,966 filed Apr. 3, 1986 (now abandoned): all of which are incorporated herein by reference in their entirety.

BACKGROUND OF THE INVENTION

The present invention concerns corrosion inhibitor compositions and a method for preventing or reducing the corrosion of metals.

During the drilling and servicing of oil and gas wells, the metal tools and equipment associated therewith are susceptible to corrosion. It is therefore highly desirable to have corrosion inhibitors for the protection of these metal tools and equipment. The present invention provides a method for the protection of metals or metal objects which are employed in corrosive atmospheres.

SUMMARY OF THE INVENTION

One aspect of the present invention pertains to a corrosion inhibitor composition which comprises (A) (1) a reaction product of (a) at least one vinyl substituted pyrazine compound and (b) at least one saturated or unsaturated primary or secondary aliphatic, cycloaliphatic or aromatic amine or (2) a mineral acid or carboxylic acid salt of said reaction product and (B) a carrier medium for component (A).

Another aspect of the present invention pertains to a method for preventing or reducing the corrosion of metals or metal objects employed in a corrosive atmosphere which method comprises contacting said metal or metal object with a corrosion inhibiting amount of a corrosion inhibitor composition containing (A) the reaction product of (1) at least one vinyl substituted pyrazine compound; and (2) at least one saturated or unsaturated primary or secondary aliphatic, cycloaliphatic or aromatic amine or (B) the mineral acid salt or carboxylic acid salt or said reaction product or (C) a combination of (A) and (B).

DETAILED DESCRIPTION OF THE INVENTION

The reaction between the vinyl substituted pyrazine compound and the amine can be conducted at temperatures of from about 25° C. to about 250° C., preferably from about 60° C. to about 200° C., most preferably from about 90° C. to about 140° C. in the presence of a catalyst and optionally in the presence of a suitable reaction medium for a time sufficient to complete the reaction, usually from about 30 minutes to about 96 hours, preferably from about 2 hours to about 24 hours, most preferably from about 2 hours to about 8 hours. Preferably, the vinyl substituted pyrazine compound and the amine are reacted at their reflux temperature in the absence of a suitable reaction medium or solvent. Also, the reaction can be conducted under reduced pressure.

The mole ratio of amine to vinyl substituted pyrazine compound is from about 0.1:1 to about 4:1, suitably from about 0.25:1 to about 2:1, more suitably from about 0.50 1 to about 1:1.

Suitable vinyl substituted pyrazine compounds include, for example, those represented by the following formula

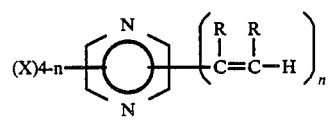

wherein each R is independently hydrogen or an aliphatic hydrocarbon group having from 1 to about 4, preferably from 1 to about 2, carbon atoms: each X is independently hydrogen, halogen, $-NO_2$ or a hydrocarbyl or hydrocarbyloxy group having from 1 to about 24 carbon atom, with the proviso that any X group does not interfere with the reaction between the vinyl substituted pyrazine compound and the amine of component (A-2): and n has a value from 1 to 4.

The term hydrocarbyl as employed herein includes, alkyl, cycloalkyl, aryl, aralkyl, alkaryl, alkenyl and the like. Likewise, the term hydrocarbyloxy as employed herein includes, alkyloxy, cycloalkyloxy, aryloxy, aralkyloxy, alkaryloxy, alkenyloxy and the like.

Particularly suitable vinyl substituted pyrazine compounds include, for example, 2-vinylpyrazine (2-ethenylpyrazine), 2,5-divinylpyrazine (2,5-diethenylpyrazine), 2-methyl-3-vinylpyrazine (3-ethenyl-2-methylpyrazine), 2-methyl-5-vinylpyrazine (5-ethenyl-2-methylpyrazine), 2-methyl-6-vinylpyrazine (6-ethenyl-2-methylpyrazine), 2,5-dimethyl-3-vinylpyrazine (3-ethenyl-2,5-dimethylpyrazine), 2,6-dimethyl-5-vinylpyrazine (5-ethenyl-2,6-dimethylpyrazine), 2,3,6-trimethyl-5-vinylpyrazine (5-ethenyl-2,3,6-trimethylpyrazine), 2,6-dimethyl-3,5-divinylpyrazine (3,5-diethenyl-2,6-dimethylpyrazine), 2-ethyl-6-methyl-5-vinylpyrazine (5-ethenyl-2-ethyl-6-methylpyrazine), 2,6-diethyl-5-vinylpyrazine (5-ethenyl-2,6-diethylpyrazine), 2-methyl-5-(1-methylvinyl)pyrazine (2-methyl-5-(1-methylethenyl)pyrazine), 2-(2-ethylbut-1-enyl)-6-methylpyrazine, 2-methyl-6-(2-methylprop-1-enyl)pyrazine, 2-(but-1,3-dienyl)-6-methylpyrazine, 3,6-diethyl-2-(pent-1-enyl)pyrazine, 2-(but-1,3-dienyl)-3,6-dimethylpyrazine, 2-methyl-5-(prop-1-enyl)pyrazine, 2-(6-(4-(1-methylethen-1-yl)cyclohex-1-enyl))-3,5,6-trimethylpyrazine, 2-(6-(4-(1-methylethen-1-yl)cyclohex-1-enyl))-5,6-dimethylpyrazine, mixtures thereof and the like.

Suitable amines which can be employed herein include saturated and unsaturated aliphatic, cycloaliphatic or aromatic amines such as, for example, those represented by the formula

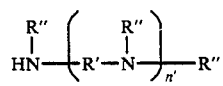

wherein each R' is independently a hydrocarbyl or hydrocarbyloxy group having from about 1 to about 12, preferably from about 2 to about 6, most preferably from about 2 to about 4 carbon atoms; each R" is independently hydrogen or a hydrocarbyl or hydrocarbyloxy or amino substituted hydrocarbyl or amino substituted hydrocarbyloxy group having from 1 to about 72, preferably from about 8 to about 36, most preferably from about 10 to about 18 carbon atoms and n' has a value from zero to about 24, preferably from zero to about 2: with the proviso that when n' is zero, R" cannot be hydrogen.

Suitable amines also include, for example. 1,2-ethanediamine (ethylenediamine), piperazine, N-(2-aminoethyl)-1,2-ethanediamine, N-methyl-1,2-ethanediamine, 1,3-propanediamine, 1,2-propanediamine, 1,4-butanediamine, N-(3-aminopropyl)-1,4-butanediamine. N-(2-aminoethyl)-1,4-butanediamine, N-(3-aminopropyl)-1,3-propanediamine, bis-(2-aminopropyl)amine, 1-pipereneazineethanamine, triethylenetetramine, tetraethyl pentamine, pentaethylenehexamine, hexaethyleneheptamine, N,N-dibutyl-1,3-propanediamine, N,N'-dipropyl-1,7-heptanediamine, N,N-dioctyl-1,2ethanediamine, N,N'-dioctyl-1,3-propanediamine, N,N-didecyl-1,3-propanediamine, 1,10-dodecanediamine, 5,11-pentadecanediamine, 4,13-hexadecanediamine, 2,2,11-trimethyl-1,11-dodecanediamine, 5,13-diethyl-6,12heptadecanediamine, 3,4-diethyl-4,13-hexadecanediamine, 12-ethyl-2-methyl-2-propyl-1,11-tetradecanediamine, 5,15-diethyl-5,14-nonadecanediamine, N-butyl-1-butanamine, N-hexyl-1-hexanamine, N-octyl-1-octanamine, N-nonyl-1-nonanamine(di-n-nonylamine), bis-2-methyl(2-propenyl)amine, 9-octadecen-1-amine, 3-isopropoxypropylamine, 3-(2-methoxyethoxy)propylamine, N-(3-ethoxypropyl)ethylamine, bis-(2-ethoxyethyl)amine, 4,4-diethoxybutylamine, 2-(n-butylamino)ethanol, 2,2'-(butylimino)diethanol, 2-(3-aminopropylamino)ethanol. 1-(2-aminoethylamino)-2-propanol, 6,9,12-trioxa-3,15-diazaheptadecane-1,17-diol, N-3-(decyloxy)propyl-1,3-propanediamine, 1-(2-aminoethyl)amino-2-tetradecanol, 1-(3-aminopropyl)-amino-2-dodecanol, 5,5'-oxybis-1-pentanamine, 5-[(3ethylamino)propyl]amino-1-pentanol, 1-piperazineethanol, 1-piperazinepropanol, 4-amino-1-piperazineethanol, N-(3-aminopropyl)piperidine, 2-piperidineethanol, cyclohexanemethylamine (hexahydrobenzylamine), cyclohexanebutylamine, cycloheptylamine, cyclooctylamine, N-methylcyclooctylamine, cyclododecylamine, N-methylcyclododecylamine, octamethyleneimine, N-(3-aminopropyl)morpholine, 4-hexyloxyaniline, 4-pentyloxyaniline, 1,4-benzodioxan-6-amine, 2-amino-4-tertbutylphenol, N,N-dimethyl-p-phenylenediamine, 2-biphenylamine, 4-biphenylamine, 2-aminonaphthalene, 2-fluorenamine, 1-anthramine, 4-phenylbutylamine, 2-(benzyloxy)ethylamine, 2-(3-phenethylamine)ethanethiol, 4-amino-1-benzylpiperidine, tall oil amine, soya amine, hydrogenated tallow amine, tallow amine, $C_8$–$C_{15}$ ether amine, ether-1,3-propylenediamines, ether-1,2-ethylenedimaines, partially alkoxylated or partially polyalkoxylated amines or polyamines, aminated polyoxyalkylene polyols, mixtures thereof and the like.

Particularly suitable amines include, for example, 1-heptanamine, 1-octanamine, 1-nonamine, 1-decanamine, 1-undecanamine, 1-dodecanamine, 1-tridecanamine, 1-tetradecanamine, 1-pentadecanamine, 1-hexadecanamine, 1-heptadecanamine, 1-octadecanamine, N-methylhexanamine, N-methylheptanamine, N-methyl-1-decanamine, N-(1-methylethyl)-1-pentanamine, N-(1-methylethyl)-1-decanamine, N-methyl-1-octadecanamine, N-dodecyl-1-dodecanamine, N-decyl-1,2-ethanediamine, N-tetradecyl-1,2-ethanediamine, N-decyl-1,3-propanediamine, N-dodecyl-1-dodecanamine, N-decyl-1,2-ethanediamine, N-octadecyl-1,2-ethanediamine, N-decyl-1,3-propanediamine, N-hexadecyl-1,3-propanediamine, N-heptadecyl-1,3-propanediamine, N-octadecyl-1,2-propanediamine, N-octadecyl-1,3-propanediamine, N-octadecyl-1,4-butanediamine, mixtures thereof and the like.

Suitable catalysts which can be employed to enhance the reaction between the vinyl substituted pyrazine compound and the amine include acidic and basic materials. Suitable acids include nitric, phosphoric and sulfuric. Particularly suitable acids are the hydrohalide acids and the carboxylic acids such as for example, hydrochloric acid, hydrobromic acid, hydroiodic acid, acetic acid, propionic acid, butanoic acid, benzoic acid, citric acid, tartaric acid, lactic acid, mixtures thereof and the like. A particularly suitable base is sodium metal.

Suitable reaction media in which the vinyl substituted pyrazine and amine compounds can be reacted include, for example, water, alcohols, hydrocarbons and combinations thereof and the like. Particularly suitable alcohols include, for example, methanol, ethanol or mixtures thereof.

The reaction product of the vinyl substituted pyrazine compounds with amines are believed to be those compounds or mixtures of compounds represented by the formulas

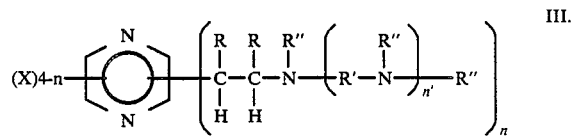

III.

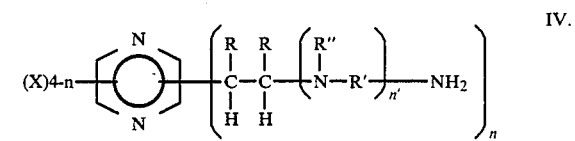

IV.

wherein each R is independently hydrogen or an aliphatic hydrocarbon group having from 1 to about 4 carbon atoms; each R' is independently a hydrocarbyl or hydrocarbyloxy group having from about 1 to about 12, preferably from about 2 to about 6, most preferably from about 2 to about 4 carbon atoms: each R" is independently hydrogen or a hydrocarbyl or hydrocarbyloxy group having from 1 to about 72, preferably from about 8 to about 36, most preferably from about 10 to about 18 carbon atoms: each X is independently hydrogen, halogen, $-NO_2$ or a hydrocarbyl or hydrocarbyloxy group having from 1 to about 24 carbon atoms, with the proviso that any X group does not interfere with the reaction between the vinyl substituted pyrazine compound and the amine of component (A-2); n has a value from 1 to 4; and n' has a value from zero to about 24, preferably from about zero to about 12, most preferably from zero to about 2 with the proviso that when n' is zero, R" cannot be hydrogen.

The method of the present invention can also use salts of the compounds or mixtures of compounds of the general formulas III and IV. These salts may be formed with a mineral acid such as hydrochloric acid, with a carboxylic acid such as acetic acid, propionic acid or a long chain fatty acid such as, for example, tall oil fatty acid or dimerized or trimerized fatty acids, or with a sulphonic acid such as benzene sulphonic acid. Where a salt of the corrosion inhibiting compound is employed, the preferred salts are an acetic acid salt, a tall oil fatty acid salt or a mixture of salts of both of these acids. Acetamides can be formed from the acetate salt by the loss of water. For example, water can be removed from the acetate salt under azeotropic distillation conditions to yield the acetamide. However, under standard conditions the reaction can be halted to yield the acetate salt. An unsalified product results with the use of small amounts (e.g. 0.05 equiv.) of acetic acid catalyst.

The acids can be reacted in amounts which correspond to moles of acid per mole of vinyl substituted pyrazine compound employed of from about 0.1:1 to about 8:1, suitably from about 0.25:1 to about 2:1, more suitably from about 0.5:1 to about 1:1.

Suitable media in which the corrosion inhibitor compounds can be mixed to form the corrosion inhibitor compounds of the present invention include any solvent in which the corrosion inhibitor compound is soluble or dispersible. Suitable such media includes, for example, water, brine, alcohols, glycols, ethers, aromatic and aliphatic hydrocarbons, combinations thereof and the like. Particularly suitable alcohols include, ethanol and isopropanol. Particularly suitable hydrocarbon solvents include, for example, toluene, xylene, resin oil, kerosene and the like.

The corrosion inhibitor compositions of the present invention usually contain from about 1 to about 90, preferably from about 10 to about 70, most preferably from about 10 to about 40 parts of the reaction product of the vinyl substituted pyrazine and amine compound and from about 10 to about 99, preferably from about 30 to about 90, most preferably from about 60 to about 90 parts by weight of the carrier medium.

The corrosion inhibitor compositions of the present invention can also, if desired, contain other additives such as, for example, deemulsifiers, water wetting agents, anti-freeze additives, biocides, fungicides, surfactants, viscosifiers, commingled gases, defoamers, iron control agents, sequestering and/or chelating agents, phosphates, quaternary ammonium compounds, amine salts and the like. For example, surface active agents are used to assure complete dispersion of active ingredients throughout the corrosion inhibitor composition and thus provide a better contact of the corrosion inhibitor with the surface of the metal object which is being protected.

The corrosion inhibitor compositions of the present invention are employed in a functionally effective amount. That is, any quantity which will provide some degree of inhibition of corrosion is sufficient. Typical amounts of corrosion inhibitor composition for use in oil and/or gas well treatment can range from about one to about 2,000 ppm for continuous treatment or about 200 to about 50,000 ppm for squeeze treatment based on the weight of corrosive well fluids in contact with the metal compositions. Amounts of corrosion inhibitor in excess of 50,000 ppm can provide additional corrosion inhibition but at increased expense.

The corrosion inhibitor compositions of the present invention are useful in applications such as, for example, oil and/or gas well drilling, completion, workover, stimulation, transfer, processing and storage applications. Other applications outside the oil and gas industry for which the corrosion inhibitor compositions of the present invention can be employed include, for example, inhibitors in geothermal wells, protection of metal alloys during steel pickling operations and the like.

The following examples are illustrative of the present invention.

EXAMPLE 1

2-Vinylpyrazine (10.2 g, 0.096 mole), Kemamine P-650 (13.1 g, 0.063 mole) were stirred in a 50 ml reactor equipped with an immersion thermometer and glycol cooled condenser. Kemamine P-650 is a mixture of $C_{10-18}$ primary amines commercially available from Witco Chemical Co. which consists primarily of 1-decanamine, 1-dodecanamine, 1-tetradecanamine, 1-hexadecanamine, 1-octadecamine and 1-octadecen-1-amine. Glacial acetic acid (1.23 g, 0.021 mole) was added dropwise to the reactor contents. Then the reactor contents were heated between 53° C. and 120° C. for 5 hours and 41 minutes (20,460 s).

EXAMPLE 2

A portion of the product produced in Example 1 was heated an additional 14 hours and 46 minutes (53,160 s) between 107° C. and 131° C. The product was soluble in both ethanol and xylene. Electron impact capillary mass spectrometry supported the presence of the following compounds or their acetate salt.

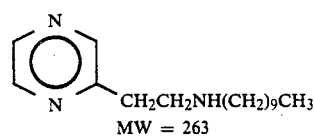

MW = 263

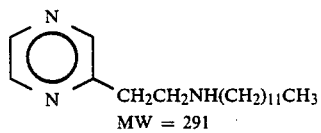

MW = 291

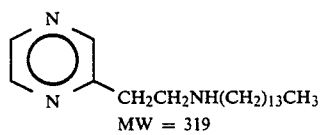

MW = 319

EXAMPLE 3

2-Vinylpyrazine (5.23 g, 0.049 mole), dodecanamine (18.36, 0.099 mole) and methanol (11.92 g) were stirred in a nitrogen atmosphere in a reactor of the type described in Example 1. Glacial acetic acid (1.64 g, 0.027 mole) was added dropwise to the reactor contents Then the reactor contents were heated between 78° C. and 112° C. for 24 hours and 4 minutes (86,640 s). The resultant reaction product was subjected to rotary evaporation under full vacuum between 80° C. and 100° C. for 62 minutes (3720 s). The product was soluble in both ethanol and xylene.

EXAMPLE 4

2-Vinylpyrazine (10.03 g, 0.0946 mole), dodecanamine (17.51 g, 0.0945 mole) and glacial acetic acid (5.65 g, 0.094 mole) were stirred in a nitrogen atmosphere in a reactor of the type described in Example 1. Then the reactor contents were heated between 118° C. and 134° C. for 20 hours and 11 minutes (72,660 s). After cooling to room temperature, the reaction product was a reddish brown waxy solid which was soluble in both ethanol and xylene.

EXAMPLE 5

2-Vinylpyrazine (9.54 g, 0.09 mole), triethylenetetramine (14.33 g, 0.09 mole) and glacial acetic acid (5.46 5, 0.091 mole) were stirred in a nitrogen atmosphere in a reactor of the type described in Example 1. Then the reactor contents were heated between 109° C. and 131° C. for 14 hours and 38 minutes (52,680 s). After cooling to room temperature, the reaction product was a dark brown viscous liquid that was soluble in hot ethanol.

The corrosion protection of Examples 1-5 was determined with the 80° C. (175° F.) batch wheel test procedure. The results are given in Table I. The test was performed as follows:

A brine solution containing 89.89% deionized water, 9.62% sodium chloride, 0.305% calcium chloride and a 0.186% hydrated magnesium chloride complex was prepared. All percentages are by weight. This brine solution was saturated under carbon dioxide purge until a pH of 3.8 was achieved. The solution was treated with sodium persulfate to remove oxygen. The desired corrosion inhibitor compound was added to the solution. About 720 ml of this brine solution and 80 ml of kerosene (90% brine/10% kerosene) treated with sodium persulfate were charged into a 32 oz. (946.4 ml) bottle. To this charge was added enough hydrated sodium sulfide to generate a suitable amount of hydrogen sulfide (i.e., about 300 ppm hydrogen sulfide based on total fluids). Metal coupons (12"×¼"×1/16", 304.8 mm ×6.35 mm ×1.59 mm) of 1020 carbon steel were degreased with an inhibited methylchloroform, acidized with 16% hydrochloric acid, washed and dried. Each coupon weighed about 19 g. A metal coupon was placed in the bottle containing the brine, kerosene and ingredients as previously described. The bottle was capped and acetic acid was injected into the bottle through a septum. The bottle was placed on a vertically rotating wheel held at 175° F. (79.4° C.) and the sample was rotated at 26 rpm (0.43 rps) for 24 hours (86,400 s). The coupons were removed from the bottle, cleaned, washed, dried and reweighed and the percent protection afforded them by the inhibitor was calculated as the percent protection by the following formula:

$$\% \text{ protection} = 100 - \frac{\text{inhibitor coupon weight loss} \times 100}{\text{blank coupon weight loss}}$$

The weight loss is given to the nearest whole percent. The tests wherein no inhibitor is employed are for comparative purposes and are designated as blanks.

The corrosion rates are also determined in milliinches per year (mpy) corrosion rates by the following formula:

$$mpy = \frac{534 \text{ (milligrams weight loss of coupon)}}{d \times a \times t}$$

where
d = density of 1020 carbon steel = 7.86 g/ml
a = surface area (in.) of metal coupons
t = test time in hours

TABLE I

| Test No. | Inhibitor Type | Concentration | Weight Loss (g) | MPY[1] | Percent Protection |
|---|---|---|---|---|---|
| A-1 | None[3] | 0 ppm | 0.1979 | 76.9 | 0 |
| A-2 | Ex. 1 | 100 ppm | 0.0054 | 2.1 | 97 |
| B-1 | None[3] | 0 ppm | 0.1915 | 73.2 | 0 |
| B-2 | Ex. 2 | 100 ppm | 0.0062 | 2.4 | 97 |
| C-1 | None[3] | 0 ppm | 0.1810 | 73.4 | 0 |
| C-2 | Ex. 3 | 100 ppm | 0.0073 | 3.0 | 96 |
| C-3 | Ex. 4 | 100 ppm | 0.0098 | 4.1 | 95 |
| C-4 | Ex. 5 | 100 ppm | 0.0250 | 10.3 | 86 |
| D-1 | None[3] | 0 ppm | 0.3328 | 131.0 | 0 |
| D-2 | Corban A-163[2,3] | 100 ppm | 0.0658 | 26.0 | 80 |

[1] MPY is mils per year
[2] Corban A-163 is a commercial corrosion inhibitor available from Dowell-Schlumberger
[3] Not an example of this invention The data in Table I demonstrates that 100 ppm of the inhibitors of this invention exhibit good corrosion protection under simulated downhole tests at 80° C. In most cases the corrosion protection is better than that exhibited by commercially available Corban A-163. Thus, the corrosion inhibitors of this invention are suitable for the protection of metal alloys against corrosion due to corrosive fluids produced in oil and gas well formations and harmful to said metal alloys at or below 80° C. In addition, the corrosion inhibitors of this invention are suitable for the corrosion protection of pipelines, storage tanks, pumps, etc. that exist above ground for the purpose of separating, recovering and/or transporting the oil and/or gas from the produced fluids.

What is claimed is:

1. A corrosion inhibitor composition which
   (A) at least one of
      (1) the product resulting from reacting at a temperature of from about 25° C. to about 250° C. for a time sufficient to complete the reaction
         (a) 2-vinylpyrazine, 2-methyl-5-vinylpyrazine or a combination thereof; and
         (b) 1-decanamine, 1-undecanamine, 1-dodecanamine, 1-tridecanamine, 1-tetradecanamine, 1-pentadecanamine, 1-hexadecanamine, 1-heptadecanamine, 1-octadecanamine, 1-octadecen-1-amine, N-octyl-1,2-ethanediamine, N-hexadecyl-1,3-propanediamine, N-heptadecyl-1,3-propanediamine, N-octadecyl-1,2-propanediamine N-octadecyl-1,3-propanediamine, tetraethylenepentamine, pentaethylenehexamine, hexaethylene-heptamine or combination thereof; or
      (2) a mineral acid salt or carboxylic acid salt of said reaction product; or
      (3) a combination of (1) and (2); and
   (B) a carrier medium for component (A).

2. An inhibitor composition of claim 1 wherein component (A) is a mineral acid salt or carboxylic acid salt of said reaction product.

3. An inhibitor composition of claim 1 wherein component (B) is ethanol, isopropanol, xylene or combination thereof.

4. An inhibitor composition of claim 2 wherein component (B) is ethanol, isopropanol, xylene or combination thereof.

5. A method for preventing or reducing the corrosion of metals or objects prepared from metals employed in a corrosive atmosphere which method comprises contacting said metal or metal object with a corrosion inhibiting amount of a corrosion inhibitor composition which contains at least one of (A) the product resulting from reacting at a temperature of from about 25° C. to about 250° C. for a time sufficient to complete the reaction
  (1) 2-vinylpyrazine, 2-methyl-5-vinylpyrazine or a combination thereof; and
  (2) 1-decanamine, 1-undecanamine, 1-dodecanamine, 1-tridecanamine, 1-tetradecanamine, 1-pentadecanamine, 1-hexadecanamine, 1-heptadecanamine, 1-octadecanamine, 1-octadecen-1-amine, N-octyl-1,2-ethanediamine, N-hexadecyl-1,3-propanediamine, N-heptadecyl-1,3-propanediamine, N-octadecyl-1,2-propanediamine, N-octadecyl-1,3-propanediamine, tetraethylenepentamine, pentaethylenehexamine, hexaethyleneheptamine or combination thereof: or (B) a mineral acid salt or carboxylic acid salt of said reaction product or (C) a combination of (A) and (B).

* * * * *